Sept. 9, 1952
A. C. STALEY
2,609,664
PLURAL COMBUSTION PRODUCTS GENERATOR
IN RING COAXIAL WITH TURBINE
Filed Dec. 12, 1946
3 Sheets-Sheet 1

INVENTOR.
Allen C. Staley.
BY
Harness and Harris
ATTORNEYS.

Sept. 9, 1952 A. C. STALEY 2,609,664
PLURAL COMBUSTION PRODUCTS GENERATOR
IN RING COAXIAL WITH TURBINE
Filed Dec. 12, 1946 3 Sheets-Sheet 2

INVENTOR.
Allen C. Staley.
BY
Harness and Harris
ATTORNEYS.

Sept. 9, 1952  A. C. STALEY  2,609,664
PLURAL COMBUSTION PRODUCTS GENERATOR
IN RING COAXIAL WITH TURBINE
Filed Dec. 12, 1946  3 Sheets-Sheet 3

INVENTOR.
Allen C. Staley
BY
Harness and Harris
ATTORNEYS

Patented Sept. 9, 1952

2,609,664

UNITED STATES PATENT OFFICE 2,609,664

PLURAL COMBUSTION PRODUCTS GENERATOR IN RING COAXIAL WITH TURBINE

Allen C. Staley, Birmingham, Mich., assignor to Chrysler Corporation, Highland Park, Mich., a corporation of Delaware Application December 12, 1946, Serial No. 715,841

11 Claims. (Cl. 60—39.37)

This invention relates to a power plant that may be used for the propulsion of vehicles. More specifically, it relates to a power plant including a gas turbine and a compressor for providing a compressed gas combining with fuel to form gaseous products driving the turbine.

In a power plant having a gas turbine as the driving means, there is the problem of making the various parts of the power plant within a given space, because the parts normally require considerable space individually since they may include in addition to the gas turbine, a compressor, burners and means for utilizing the waste heat of products being exhausted from the turbine.

An object of the present invention is to provide a compact arrangement of a power plant comprising a gas turbine as the driving means and its associated parts including a means for recovering waste heat in products exhausted from the turbine.

Another object is to provide a novel arrangement of burners leading to a gas turbine and a waste heat recoverer for products exhausted by the turbine.

Other objects will appear from the disclosure.

Figure 1:
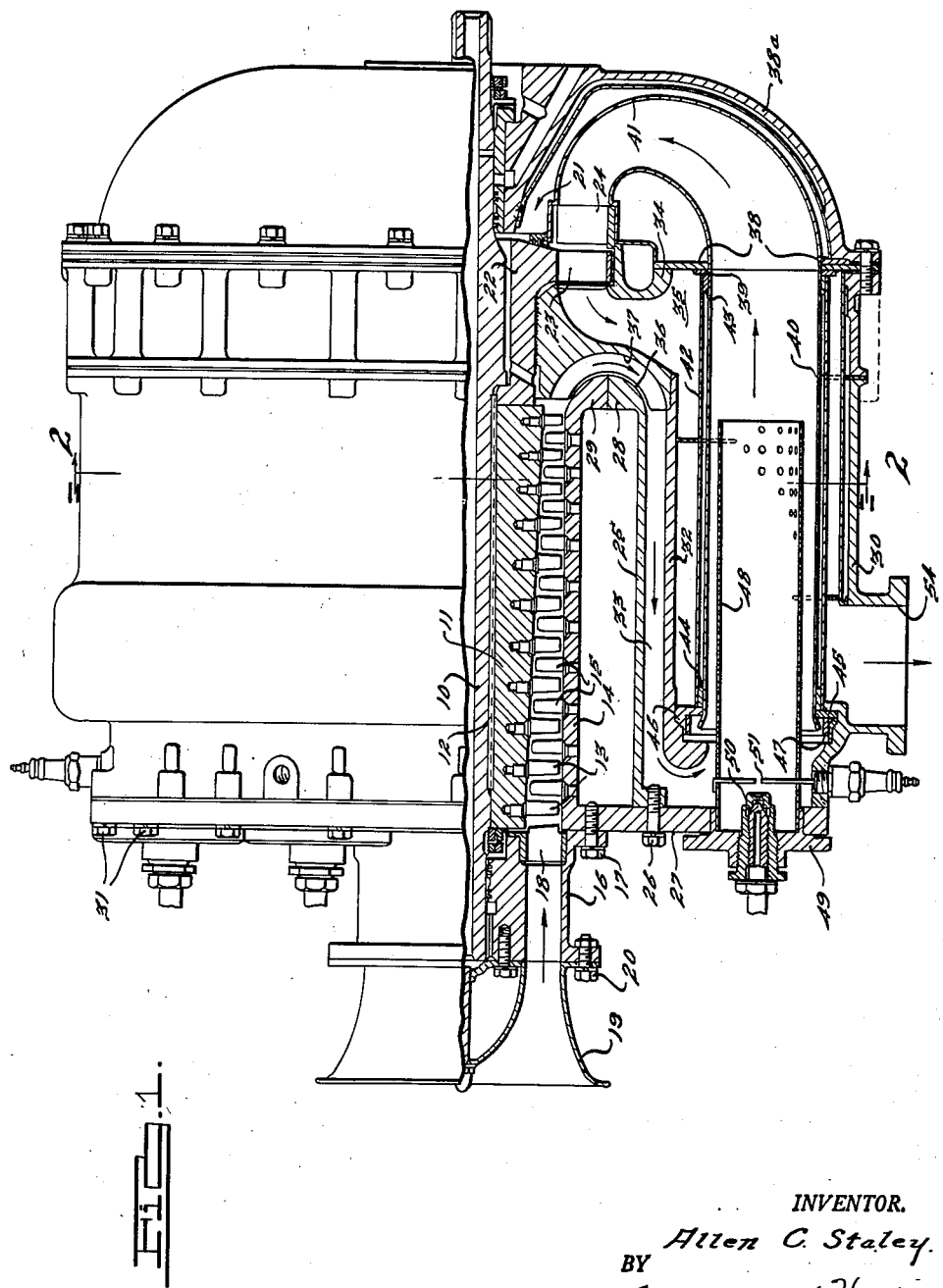
Fig. 1 is a view of the novel power plant of the present invention, partially in longitudinal section and partially in elevation.

The reference character 10 designates a shaft upon which is mounted a rotor 11 of a compressor. The rotor is drivingly connected to the shaft by means of a key 12. The rotor carries a plurality of stages of blades 13. A stator 14 of the compressor surrounds the rotor 11 and carries a plurality of stages of blades 15 positioned between the rotor blades 13. An inlet member 16 is secured by a plurality of screws 17 to the stator 14 and carries a grid 18. An inlet guide 19 is secured to the inlet member 16 by means of bolts 20. A gas turbine 21 is coaxial with the compressor and comprises a rotor 22 carrying rotating blades 23. The rotor 22 is keyed to the shaft 12. The turbine 21 also has a stationary member carrying a plurality of stationary blades 24.

A member 25 is secured by screws 26 to an end plate portion 27 integral with the stator 14. The member 25 has an end portion 28 closely embracing an end portion 29 on the stator 14. A casing 30 is secured to the end plate portion 27 by screws 31 and has an inner wall portion 32 cooperating with the member 25 to form a cylindrical gas passage 33. A member 34 has a passage 35 shaped to conduct gases exhausted from the turbine 21 and is appropriately shaped as indicated at 36, to cooperate with the portions 28 and 29 of the member 25 and the stator 14 to form a curved passage 37 connecting the space between the stator and rotor of the compressor with the passage 33.

A header plate 38 is clamped to the member 34 by an end part 38ª. A ring 39 is appropriately bonded to the header plate 38. A tube 40 is mounted in the header plate 38 in the ring 39 and has a curved portion 41 leading to the stationary blades 24 of the turbine 21. An insulating tube 42 surrounds the tube 40 and is held in spaced relation with respect thereto by means of rings 43 and 44. One end of the insulating tube 42 abuts the ring 39 bonded to the header plate 38 and the other end abuts another header plate 45 in which one end of the tube 40 is mounted. The inner plate 45 fits within the casing 30 and its inner wall portion 32 and presses a gasket 46 against shoulders formed in the casing 30. A retaining ring 47 holds the gasket 46 out against the casing 30 and the header plate 45. Positioned within the tube 40 is an apertured burner tube 48, the end of which is appropriately mounted in a fitting 49 carried in the end plate portion 27 of the stator 14. A fuel nozzle 50 is also mounted in the fitting 49. An igniter 51 is placed in the burner tube 48 adjacent the fuel nozzle 50.

Figure 2:
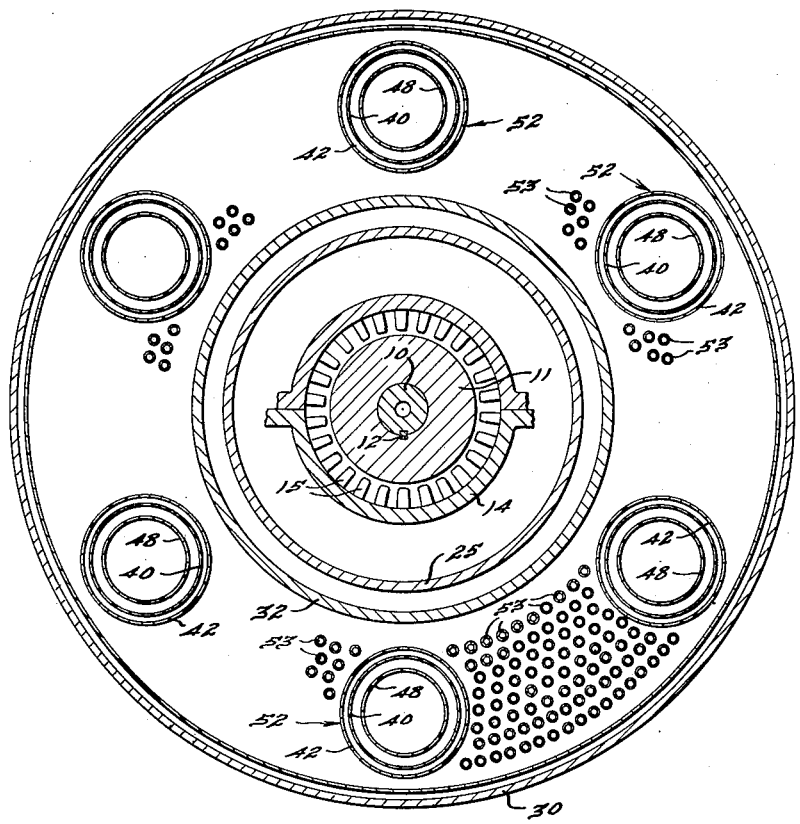
Fig. 2 is a sectional view taken on the line 2—2 of Fig. 1.

The burner tube 48, the outer tube 40, and the insulating tube 42 together with other associated parts just described constitute a single burner designated in Fig. 2 by the reference character 52. As will be seen from this figure, there are in all, six such burners placed about the compressor in spaced relation to one another. Positioned between the burners 52 is a plurality of tubes 53, each of which is mounted at one end in the header plate 38 and at the other end in the header plate 45. Thus the tubes 53 are also positioned about the compressor and it may be said that tubes 53 and the burners 52 completely surround the compressor.

In the operation of the power plant just described, a combustion-supporting medium such as air enters the compressor by way of the guide 19 and the inlet member 16, passing through the grid 18 to the rotor blades 13 and stationary blades 15. The air progresses lengthwise of the compressor through these rotor and stator blades and is compressed thereby. It is discharged from the compressor into the passage 37, and from there it finds its way into the passage 33, eventually reaching the burners 52 and the tubes 53. Part of the air passes through the burners 52, entering the outer tubes 40 and passing through the apertures in the burner tubes 48 to support the combustion of fuel issuing from the nozzles 50 and ignited by the igniters 51. The gaseous products formed by the combustion of the fuel in the combustion-supporting medium pass out of the burner tubes 48 and join with other combustion-supporting medium that has gone through the outer tubes 40 without being passed through the apertures in the burner tubes 48. These gases pass through the curved portions 41 of the tubes 40 and reach the stationary blades 24, through which they pass to the rotary blades 23 of the turbine 21 and are exhausted through the passage 35. The gases exhausted from the turbine 21 pass across the tubes 53 and leave the casing 30 by way of an outlet 54 formed in the casing 30. The gases in passing across the tubes 53 contribute a good portion of their waste heat to increasing the heat content of combustion-supporting medium passing through the tubes 53 in parallel with the combustion-supporting medium passing through the burner devices 52. The heated combustion-supporting medium passing through the tubes 53 goes to the turbine 21 and helps to drive it.

By passing combustion-supporting medium in parallel paths through burners and through tubes over which exhaust products from the turbine pass, I have been able to effect a compact arrangement of burners and waste heat recovering means by which the power plant of the present invention is enabled to occupy a minimum of space commensurate with power requirements. It will be observed from Fig. 1 that the burners 52 and the tubes 53 for combustion-supporting medium in parallel with the burners surround the compressor, and thus the longitudinal dimension of the power plant is held down while the transverse dimensions are kept within appropriate limits.

Figure 3:
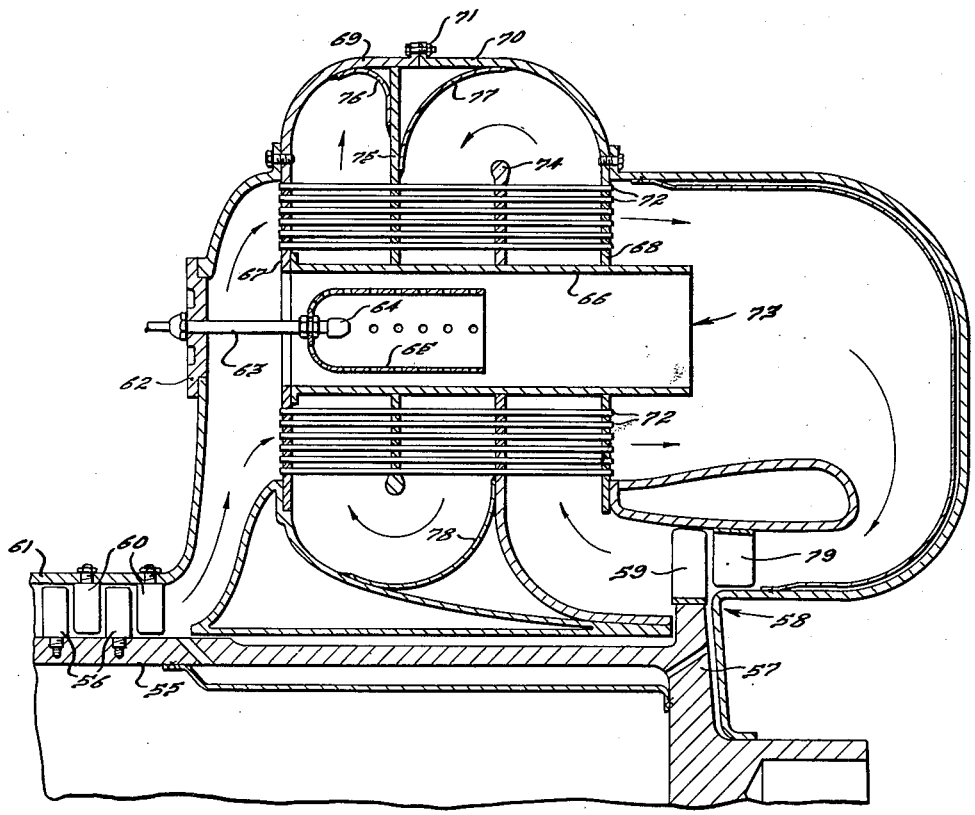
Fig. 3 is a longitudinal sectional view of a modified form of a power plant according to the present invention.

Fig. 3 shows a modified form of the present invention according to which the exhaust gases from the turbine are passed back and forth across the tubes for obtaining a most complete recovery of waste heat in the exhaust gases. According to this figure, the compressor comprises a rotor 55 carrying rotor blades 56. The rotor 55 is extended to form the rotor member 57 of a gas turbine 58 having rotor blades 59 associated with the rotor member 57. Stationary blades 60 of the compressor are mounted in a casing 61. The casing also carries a plurality of fittings 62, only one being shown. Each fitting 62 carries the end of a fuel supply conduit 63 upon which is mounted a fuel nozzle 64 and a burner tube 65. An outer tube 66 surrounds the burner tube 65 and is secured to header plates 67 and 68. These plates have curved extensions or flanges 69 and 70 that are joined to one another by nuts and bolts as indicated at 71. A plurality of small tubes 72 are mounted at their ends in header plates 67 and 68. The nozzle 64, burner tube 65, and the outer tube 66 may be considered to constitute a burner unit 73. It is contemplated that there will be a plurality of burners 73 spaced about the machine in the manner of the burner units 52 of Fig. 2, and that small tubes 72 will fill the spaces between the burner units 73 in accordance with the arrangement of Fig. 2. Thus there are small tubes 72 radially inward and outward of the burner units 73 and also between them. Baffles 74 and 75 in which the various tubes are mounted are provided so that the exhaust from the turbine 58 may travel back and forth across the tube 72 as indicated by the arrows. An outlet for the casing, which is formed of the curved parts 69 and 70, will of course, be provided, although it is not shown. Curved elements 76, 77, and 78 are mounted against the baffles 74 and 75 to promote smooth flow of the exhaust from the turbine 58.

In operation, compressed combustion-supporting medium such as air flows from the rotor and stator blades 56 and 60 outwardly and then flows through the burner unit 73 and through the small tubes 72 in parallel paths. The air to each burner unit 73 flows through the outer tube 66 and into the burner tube 65 by way of apertures formed therein. In the burner tube 65 the air supports combustion of fuel issuing from the fuel nozzle 64. The resulting combustion products flow out of the burner tube 65 to the outer tube 66 and thence through stationary blades 79 of the turbine 58 and through the rotary blades 59, causing the turbine to rotate and thereby to drive the compressor. The exhaust from the turbine passes back and forth across the tubes 72 as aforementioned, thereby heating air passing through these tubes, which air also passes through the turbine 58 to help drive it.

It will be seen from the foregoing description that the arrangement of Fig. 3 provides a compact machine in which the heat of the turbine exhaust is utilized.

I claim:

1. The combination with a compressor, and a turbine driving the compressor and axially aligned therewith; of burners surrounding the compressor in circumferentially spaced relation to one another and extending therealong, the burners being adapted to convert fuel and a combustion-supporting medium received from the compressor into combustion products for driving the turbine, and tubes surrounding and extending along the compressor in the circumferential spaces between the burners and being adapted to pass combustion-supporting medium directly from the compressor to the turbine for driving the turbine, and means for causing gaseous products exhausting from the turbine to pass over the said tubes for preheating the combustion-supporting medium while on its way from the compressor to the turbine.

2. The combination specified in claim 1, the means for preheating the combustion-supporting medium from gaseous products exhausting from the turbine being so constructed and arranged as to cause the gaseous products to move back and forth across the tubes conducting the combustion-supporting medium.

3. The combination with a compressor and a turbine driving the same; of a plurality of spaced burners adapted to convert fuel and a combustion-supporting medium delivered by the compressor into combustion products for driving the turbine, a plurality of tubes located in the spaces between the burners for separately conducting combustion-supporting medium from the compressor to the turbine, and means for causing gaseous products exhausting from the turbine to pass across the tubes for heating the combustion-supporting medium in the tubes.

4. The combination specified in claim 3, the means for causing exhaust products from the turbine to heat the combustion-supporting medium in the tubes being so constructed and arranged as to cause the exhaust products to pass back and forth across the tubes.

5. In a power plant having a compressor supplying working medium and a turbine for driving the same; an apparatus generally surrounding the compressor comprising in combination, an annular chamber having a plurality of individually encased burners therein for converting fuel and working medium into combustion products and further forming a delivery path for the flow of energy gases for the turbine, and means forming a path for the flow of working medium from the compressor and having a portion in said chamber formed of pluralities of tubes leading into said energy gas delivery path for supplying the turbine, said annular chamber being provided with means associated with said portion therein for directing the flow of gaseous products exhausted from the turbine for heating working medium for the turbine in said portion, said last-named means including a discharge opening for said chamber and a second opening for said chamber remote to said discharge opening for receiving the gaseous products aforesaid exhausted from the turbine.

6. In a power plant system having a compressor for supplying combustion-supporting medium and a turbine for driving the same; apparatus generally surrounding a compressor including the combination of fuel introducing means for adding heat to the system comprising two tubes mounted one within the other with an annular space between, one said tube being a burner tube, heat recovery means for employing the heat of the products exhausted from the turbine comprising a heat exchange tube laterally offset with respect to but generally parallel with the two said tubes, means including the two said tubes forming a first path from the compressor to the turbine through the fuel introducing means and the burner tube thereof for raising the temperature of combustion-supporting medium by combustion, and forming a second path from the compressor to the turbine through the fuel introducing means and adjacent the burner tube thereof for raising the temperature of combustion-supporting medium owing to passing adjacent said burner tube, and means forming a third path from compressor to turbine through the heat recovery means and the heat exchange tube thereof for raising the temperature of the combustion-supporting medium by heat interchange.

7. In a power plant system having a compressor for supplying combustion-supporting medium and a turbine for driving the same; apparatus generally surrounding the compressor including the combination of fuel introducing means for adding heat to the system comprising three tubes mounted one within another with an annular space between, at least one said tube being a burner tube, heat recovery means for employing the heat of the products exhausted from the turbine comprising a heat exchange tube disposed laterally offset with respect to but generally parallel with the three said tubes, means including at least a plurality of the three said tubes forming a first path from compressor to the turbine through the fuel introducing means and the burner tube thereof for raising the temperature of combustion-supporting medium by combustion and forming a second path from the compressor to the turbine through the fuel introducing means and adjacent the burner tube thereof for raising the temperature of combustion-supporting medium owing to passing adjacent said burner tube, and means forming a third path from compressor to turbine through the heat recovery means and the heat exchange tube thereof for raising the temperature of the combustion-supporting medium by heat interchange.

8. In a power plant system having a compressor for supplying combustion-supporting medium and a turbine for driving the same; apparatus generally surrounding the compressor so as to define a cylindrical space of revolution and including the combination of fuel introducing means for adding heat to the system, heat recovery means for employing the heat of the products exhausted from the turbine, and means forming a first path from the compressor to the turbine through the fuel introducing means for raising the temperature of cumbustion-supporting medium by combustion, and a second path from the compressor to the turbine through the heat recovery means for raising the temperature of combustion-supporting medium by heat interchange, said path means conforming to a substantial annular configuration within said cylindrical space in a manner wherein the first path is constituted by relatively large tube-like parts supported in the space within said apparatus and the second path is constituted by relatively small tube-like parts supported in the space within said apparatus so as to lie side by side with and parallel to the large tube-like parts.

9. In a power plant system having a compressor for supplying working medium and a turbine for driving the same; apparatus generally surrounding the compressor including the combination of fuel introducing means for adding heat to the system, heat recovery means for employing the heat of the products exhausted from the turbine, and means forming a first motive fluid path from the compressor to the turbine through the fuel introducing means for raising the temperature of the working medium by combustion, and a second motive fluid path from the compressor to the turbine through the heat recovery means for raising the temperature of the working medium by heat interchange, said first and second paths being of parallel flow configuration passing longitudinally through a common cylindrical path of revolution, and having portions common to one another wherein the paths are merged to either side of the fuel introducing and heat recovery means and between the compressor and turbine.

10. In a power plant system having a compressor for supplying combustion-supporting medium and a turbine for driving the same; apparatus generally surrounding the compressor including the combination of fuel introducing means for adding heat to the system, heat recovery means for employing the heat of the products exhausted from the turbine, and means forming a first path from the compressor to the turbine through the fuel introducing means for raising the temperature of combustion-supporting medium by combustion, and a second path from the compressor to the turbine through the heat recovery means for raising the temperature of combustion-supporting medium by heat interchange, said first and second paths being of parallel flow configuration passing longitudinally through a common cylindrical path of revolution, and being constituted respectively by a row of circumferentially spaced burner parts and by a plurality of rows of relatively smaller tubular parts, said row of burner parts being substantially radially coextensive with said plurality of rows of tubular parts as respects said cylindrical path of revolution.

11. In a power plant system having a compressor for supplying combustion-supporting medium and a turbine for driving the same; apparatus generally surrounding the compressor including the combination of fuel introducing means for adding heat to the system, heat recovery means for employing the heat of the products exhausted from the turbine, and means forming a first path from the compressor to the turbine through the fuel introducing means for raising the temperature of combustion-supporting medium by combustion, and a second path from the compressor to the turbine through the heat recovery means for raising the temperature of combustion-supporting medium by heat interchange, said first and second paths being of parallel flow configuration passing longitudinally through a common cylindrical path of revolution, and being constituted respectively by a row of circumferentially spaced burner parts and by a plurality of tubular parts at least some of which are radially spaced from the aforesaid row as respects said common cylindrical path of revolution.

ALLEN C. STALEY.

REFERENCES CITED

The following references are of record in the file of this patent:

UNITED STATES PATENTS

| Number | Name | Date |
|---|---|---|
| 2,056,198 | Lasley | Oct. 6, 1936 |
| 2,162,956 | Lysholm | June 20, 1939 |
| 2,172,809 | Schmitt | Sept. 12, 1939 |
| 2,439,273 | Silvester | Apr. 6, 1948 |
| 2,479,573 | Howard | Aug. 23, 1949 |
| 2,488,783 | Stalker | Nov. 22, 1949 |